United States Patent [19]

Bouveret et al.

[11] 4,335,745

[45] Jun. 22, 1982

[54] HYDRAULIC DISTRIBUTOR, ESPECIALLY FOR SERVO-CONTROL SYSTEMS OF AIRCRAFT AND HELICOPTERS

[75] Inventors: Marcel Bouveret, Bagneux; Gérard Devaud, Paris, both of France

[73] Assignee: S.A.M.M.-Societe d'Applications des Machines Motrices, Issy-les-Moulineaux, France

[21] Appl. No.: 163,382

[22] Filed: Jun. 26, 1980

[30] Foreign Application Priority Data

Jul. 3, 1979 [FR] France ............................... 79 17184

[51] Int. Cl.$^3$ ............................................ F16K 37/00

[52] U.S. Cl. ............................... 137/554; 137/625.22; 137/625.23; 137/625.47; 91/509

[58] Field of Search ................. 91/509, 510, 467, 470, 91/106; 137/625.22, 625.23, 625.24, 554, 625.46, 625.47

[56] References Cited

U.S. PATENT DOCUMENTS

| | | | |
|---|---|---|---|
| 3,482,486 | 12/1969 | Nordholm, Jr. | 91/509 |
| 3,529,514 | 9/1970 | Mayo et al. | 91/509 |
| 4,040,338 | 8/1977 | Wilson et al. | 92/106 |

*Primary Examiner*—William R. Cline
*Attorney, Agent, or Firm*—Young & Thompson

[57] ABSTRACT

An annular element which is stationary under normal operating conditions is interposed between a stationary sleeve and a central rotary plug. The annular element is provided with peripheral passages and radial openings, said radial openings being located in the line of extension of bores formed in the stationary sleeve. In the event of accidental seizure of the rotary plug, the annular element is automatically released and driven in rotation, thus permitting progressive transfer of the hydraulic fluid from one bore of the stationary sleeve to the adjacent bore via the peripheral passages.

7 Claims, 7 Drawing Figures

HYDRAULIC DISTRIBUTOR, ESPECIALLY FOR SERVO-CONTROL SYSTEMS OF AIRCRAFT AND HELICOPTERS

This invention relates to a hydraulic distributor which has a number of potential applications but is primarily intended to equip servo-control systems of the duplex or tandem twin-casing type for airplanes or helicopters.

In certain particular applications of a hydraulic distributor of this type and especially in the operation of aircraft control surfaces, an essential requirement for operational safety consists in the need to ensure that accidental seizure of the moving portion of the distributor within its stationary portion does not cause immobilization of the entire mechanism. To this end, it is a known practice to provide two identical distributors for supplying the control system in parallel, said distributors being operated together by means of a differential system. In the event of seizure which has the effect of immobilizing one of the two distributors, the differential system is so arranged that the control is entirely transferred to the other distributor which carries out the distribution in the requisite direction.

Although satisfactory from a functional standpoint, this arrangement has the disadvantage of being both heavy and cumbersome. Furthermore, it calls for connections between the two distributors, either within the casing which contains these latter by means of bores of complex design or externally of said casing by means of pipes and pipe-connections which further increase the overall bulk of the system.

The distributor of the type contemplated by the invention comprises a plug rotatably mounted within a stationary sleeve housed within a body or casing and pierced by bores for admission of the hydraulic fluid under pressure and discharge of the fluid to the collector-tank. Progressively-opening passages are arranged on the periphery of the rotary plug in order to ensure circulation of the hydraulic fluid from one bore of the stationary sleeve to the next when the plug is caused to rotate by manual control.

In accordance with the invention, the distributor comprises an annular element interposed between the sleeve and the rotary plug, said annular element being pierced by radial openings in the line of extension of the bores of the stationary sleeve. Passages are machined in the periphery of said annular element so as to permit progressive transfer of the hydraulic fluid from one bore of the stationary sleeve to the adjacent bore if said annular element is caused to rotate. Locking means are provided for maintaining the annular element in a normally stationary position at the time of rotation of the plug and for permitting rotational displacement of the annular element by the plug in the event of seizure of this latter within said annular element. By means of this arrangement, the hydraulic fluid is permitted to circulate from one bore to another through the passages of the annular element.

By virtue of the cylindrical shape of the annular element, said element consequently surrounds the rotary plug so as to form a type of bushing, the sleeve which is attached to the casing being placed concentrically around said bushing. Annular ducts formed between the casing and the sleeve serve to supply the distributor with hydraulic fluid. If the torque to be exerted in order to produce a rotational displacement of the plug within the annular element becomes excessive by reason of abnormal seizure of the plug within the annular element or of locking of the plug within said element as a result of accidental insertion of a foreign body, said annular element is accordingly driven in rotation. By means of the peripheral passages of the annular element, the hydraulic fluid is circulated directly and under the action of pressure towards one utilization passage and from the other utilization passage to the return, the aforesaid locking means being automatically released when a sufficient torque is exerted on the annular element.

Since the annular element is normally stationary with respect to the sleeve, there is therefore no potential danger of subsequent seizure of said element with respect to the sleeve, with the result that the distributor in accordance with the invention fully conforms to the required standard of operational safety.

In accordance with one embodiment of the invention, the locking means for maintaining the annular element in a stationary position during normal operation of the distributor and for releasing said element in rotation in the event of seizure of the rotary plug with respect to said element comprise balls which are preferably three in number and spaced at equal angular intervals. Said balls are partially engaged in corresponding recesses having V-shaped ramps machined on one end of the annular element, said balls being capable of sliding within openings of a disk which is attached to the distributor casing. As a complementary feature, said locking means comprise a second disk urged elastically against the balls by a rocker-arm which is in turn thrust by an elastic member housed within the distributor casing. In consequence, if the torque to be exerted in order to cause the plug to rotate within the annular element exceeds a predetermined value related to the force exerted by the elastic member on the rocker-arm, the annular element is accordingly driven in rotation, thrusts the balls outwards from their recesses in opposition to the controlling force exerted by the disk and the rocker-arm and permits the intended distribution of fluid with progressive flow.

Other features and advantages of the invention will be more aparent upon consideration of the following description and accompanying drawings which are given by way of example and not in any limiting sense. One embodiment of the hydraulic distributor in accordance with the invention is illustrated in these drawings, in which.

Figures 1, 2:
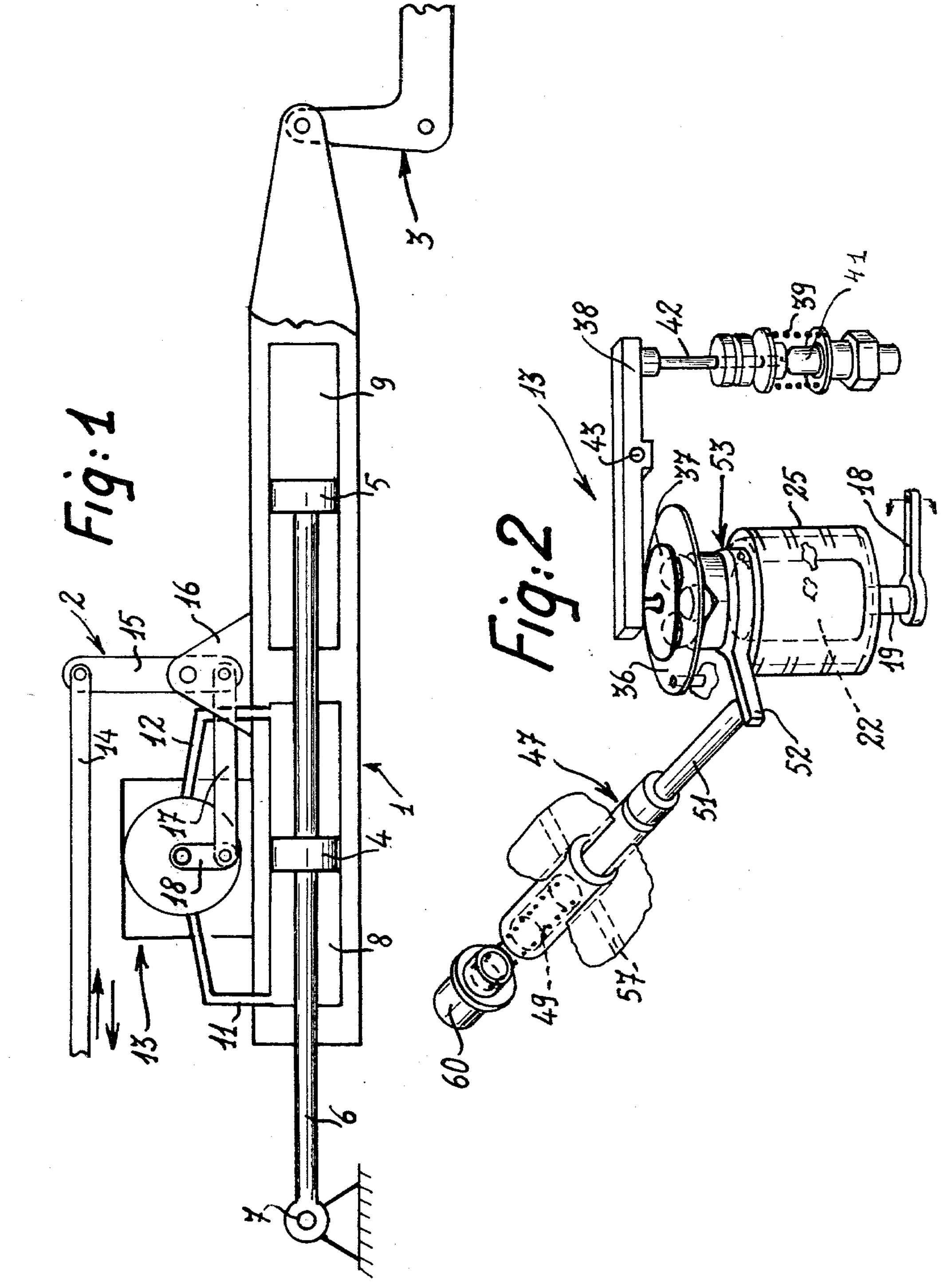
FIG. 1 is a schematic view in elevation with portions broken away, showing a hydraulic servo-control unit for actuating the flight-control surfaces of an aircraft or helicopter, and including a hydraulic distributor which can be constructed in accordance with the invention.
FIG. 2 is a view in perspective of one embodiment of the hydraulic distributor in accordance with the invention.

There is shown diagrammatically in FIG. 1 a hydraulic servo-control device which can be employed for example on an aircraft or on a helicopter and comprises a double-acting hydraulic cylinder 1 on which are pivotally mounted on the one hand a system of control connecting-rods 2 and, on the other hand, a lever 3 coupled to the rudder or elevators of the aircraft. Within the cylinder 1, two pistons 4, 5 coupled together by a rod 6 pivotally attached to a fixed point 7 are placed within two separate and distinct chambers 8, 9. The chamber 8 which contains the piston 4 communicates through two pipes 11, 12 with a hydraulic distributor 13 carried by the casing 1 and supplied by a hydraulic circuit (not shown in the drawings). The pipes 11 and 12 open on the two opposite faces of the piston 4. The chamber 9 which contains the piston 5 communicates with another hydraulic distributor (not shown) which is identical with the first and is supplied by a second hydraulic circuit.

The control system 2 of the distributor 13 comprises a connecting-rod 14 which can be actuated manually by the pilot and is pivotally attached to a lever 15, said lever being in turn rotatably mounted between two lugs 16 which are rigidly fixed to the cylinder 1. A second connecting-rod 17 is pivotally attached to said lever 15 and is in turn pivotally attached to a lever 18 which is coupled for rotation with the central rotary plug of the distributor 13.

When the pilot actuates the control rod 14 in one direction or in the other as indicated by the oppositely-directed arrows in FIG. 1, the lever 18 produces correlative rotation of the plug either in one direction or in the other, and hydraulic fluid under pressure is directed into the chamber 8 either through the pipe 11 or through the pipe 12, the fluid being returned to the collector-tank through the other pipe. From this it accordingly follows that the cylinder 1 moves with respect to the pistons 4, 5 and with respect to the piston-supporting rod 6 which remains stationary, while producing action on the flight-control surface of the aircraft until the servo-control unit is stabilized.

The operation of a servo-control device of this type is well known and will therefore not be described further.

Referring to FIGS. 2 to 7, there will now be described one embodiment of the hydraulic distributor 13 which is contemplated by the invention.

This distributor comprises a central rotary plug 19, one end 21 of which is rigidly fixed to the lever 18, and which is mounted within an annular element 22 designed in the form of a cylindrical bushing. In accordance with the invention, said annular element 22 is in turn interposed between the rotary plug 19 and a concentric sleeve 23 which is secured to a casing 24. In the embodiment shown in the drawings, the rigid attachment of the sleeve 23 to the casing 24 is obtained by means of an annular member 25 provided with a plurality of peripheral grooves in which are inserted seals 26 for ensuring leak-tightness between said member and the casing 24.

Figure 3:
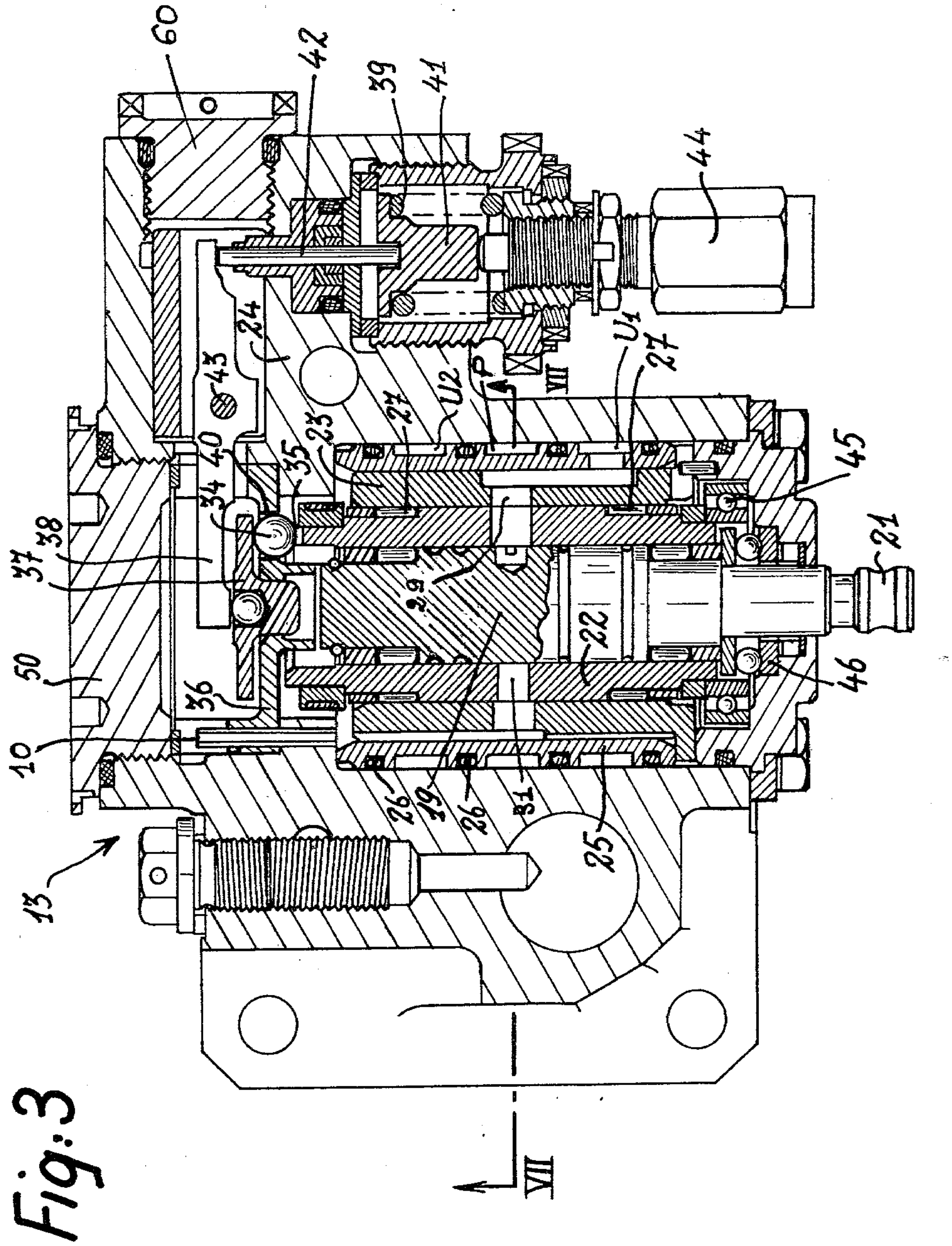
FIG. 3 is an axial sectional view to a larger scale showing the distributor of FIG. 2, this view being taken along line III—III of FIG. 4.
Figure 4:
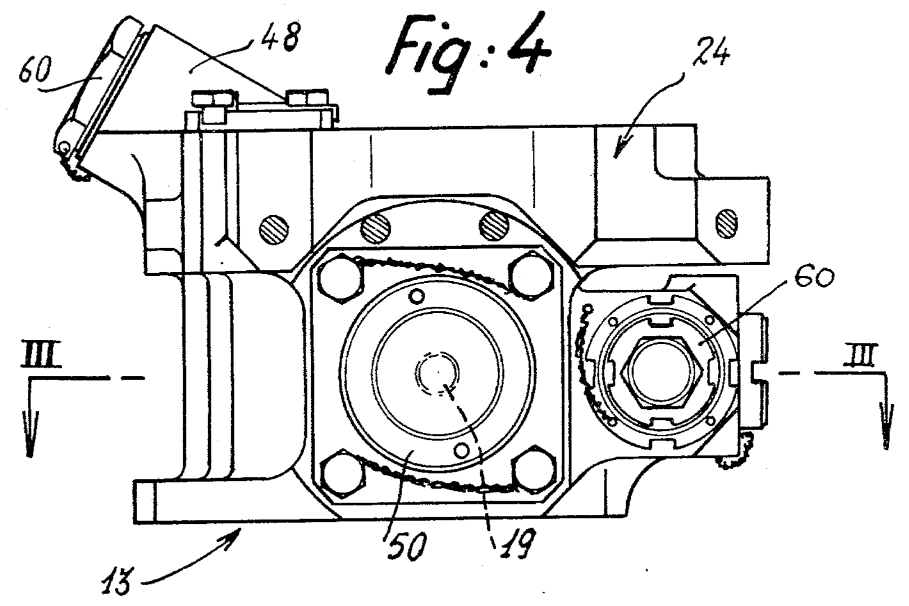
FIG. 4 is an overhead plan view of the distributor of FIGS. 2 and 3.
Figure 6:
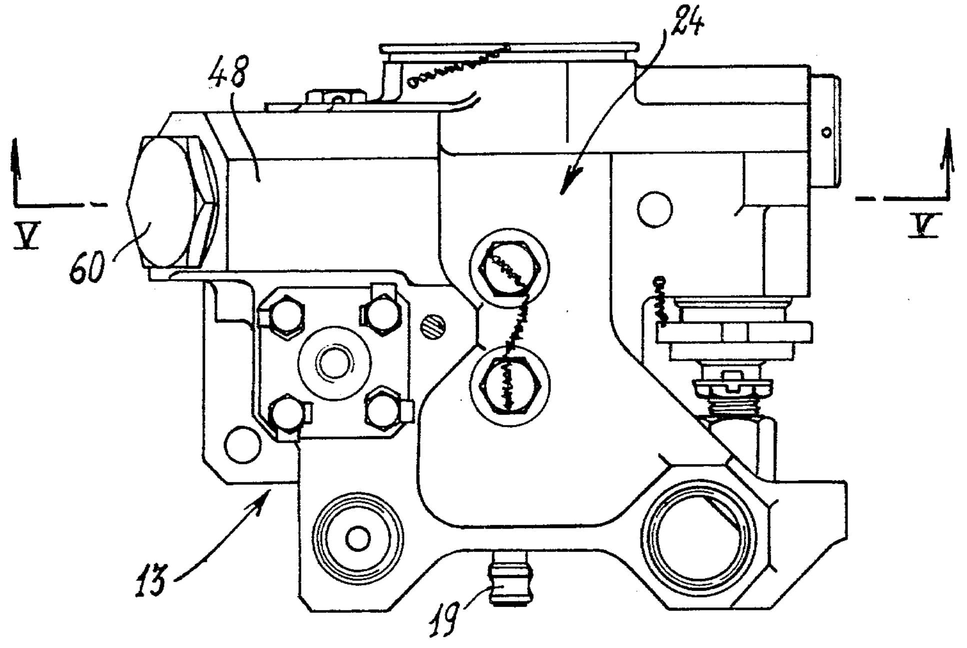
FIG. 6 is a view in side elevation showing the distributor of FIGS. 2 to 5.
Figure 7:
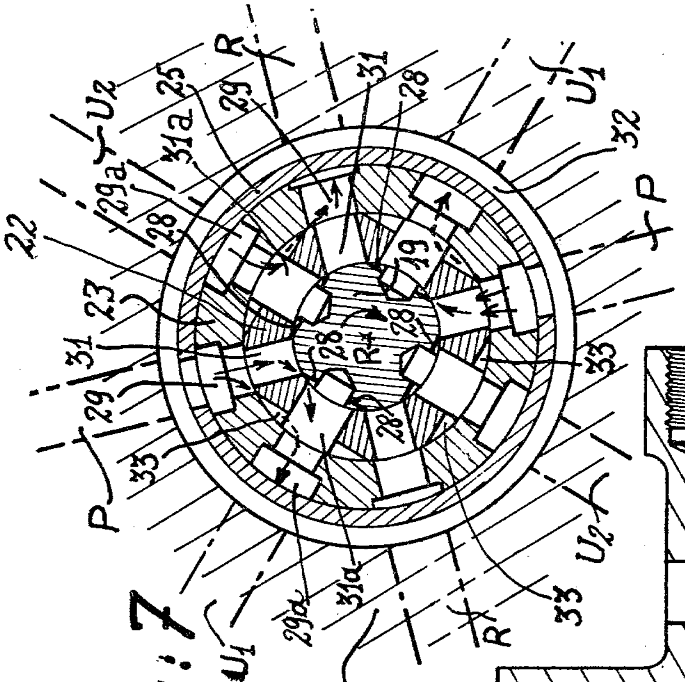
FIG. 7 is a transverse sectional view to a larger scale, this view being taken along line VII—VII of FIG. 3.

The sleeve 23 and its added member 25 are pierced by two pairs of bores 29 arranged radially and spaced on the periphery of said members. The annular element 22 is also pierced by corresponding radial openings 31 which are coaxial with the bores 29 (as shown in FIG. 7). At the periphery of the member 25, a first pair of bores 29 opens into an annular duct 32 for supplying hydraulic fluid from the hydraulic circuit (not shown), said duct 32 being provided between the casing 24 and the annular member 25. The other pair of bores 29 opens into longitudinal ducts connected to the return to the collector-tank via cavities located between the casing 24 and the sleeve 23 (as shown in FIG. 3). The two pairs of adjacent bores 29*a* and coaxial bores 31*a* are connected respectively to the passages U1 and U2.

In FIGS. 3 and 7 are shown the following ducts for the supply of hydraulic fluid from the distributor to the double-acting cylinder: the oil under pressure is admitted through the radial duct P, the duct U1 is under pressure, the duct U2 is connected to the collector-tank, and the duct R has the intended function of returning the oil into the circuit.

Furthermore, in an arrangement known per se, a series of recesses are machined in the external surface of the rotary plug 19 so as to form passages for the hydraulic fluid between two adjacent bores 31, machining being carried out in such a manner as to provide a progressive flow when the plug 19 is caused to rotate either in one direction or in the other. It is thus apparent from FIG. 7 that, if the plug 19 is rotated in the clockwise direction indicated by the arrow R, the oil under pressure which is admitted through the pipe P into the pair of diametrically opposite bores 29, 31 passes into the diametrically opposite adjacent bores 31*a*, 29*a* which communicate with the utilization passage U1 at a rate of flow which is proportional to the angle of rotation of the plug 19. Correlatively, the oil derived from the passage U2 flows at an increasing rate within the bores and orifices 29*a*, 31*a* which open into the return pipe R. This circulation of the hydraulic fluid is represented schematically by the arrows shown in FIG. 7.

In accordance with an essential feature of the invention, provision is made on the periphery of the cylindrical element 22 for a series of machined passages 33 which are adapted to correspond to the recesses 28. Said passages 33 provide a direct communication between the pairs of bores 29 and the pairs of adjacent bores if the annular element 22 is caused to rotate in the clockwise direction R, for example. Transfer of the oil from one bore 29 to the next at a progressive rate of flow is represented by arrows in FIG. 7 in the case of transfer of oil from the duct P under pressure to the utilization passage U1. However, under conditions of normal operation of the distributor, the annular element 22 remains stationarily fixed in the position shown in FIG. 7.

Each peripheral passage 28 of the rotary plug 19 is therefore virtually duplicated by a corresponding peripheral passage 33 which is machined in such a manner as to ensure in addition a progressive-flow transfer of the oil from one radial bore to the adjacent bore if the annular element 22 is caused to rotate, the purpose of this arrangement being to ensure the intended distribution of oil.

Provision is made for locking means so arranged as to maintain the annular element 22 in a normally stationary position during rotation of the plug 19 and so as to permit driving of said element 22 in rotation by the plug 19 in the event of seizure of this latter within said annular element.

In the embodiment which is illustrated, the locking means of aforesaid comprise balls 34, only one ball being visible in FIG. 3. By way of example, provision is made for three balls spaced at equal angular intervals and partially engaged in corresponding recesses 35 having V-shaped ramps machined on that end of the annular element 22 which is opposite to the actuating lever.

The balls 34 are capable of sliding within circular openings 40 arranged in a guide 36 which is attached to the casing 24 by means of a rod 10 and the screw-cap 50. The locking device also comprises a disk 37 which is urged elastically against the balls 34 by a rocker-arm 39 on which a thrust is in turn exerted by an elastic member consisting of a helical spring 39 in the example shown and housed within the casing 24.

The rocker-arm 38 and the disk 37 are placed within a chamber of the casing 24, said chamber being closed by means of end-caps 50 and 60 which are screwed into the casing. The spring 39 produces action on the end of the rocker-arm 38 by means of a pusher comprising a rod 42. The rocker-arm 38 is pivotally mounted on a pin 43 carried by the casing 24.

The pusher 41 cooperates with an electric switch unit 44 connected to a warning lamp (not shown in the drawings) which can be turned-on when the balls 34 thrust back the rocker-arm 38 against the action of the restoring spring 39 correlatively with a movement of rotation of the annular element 22 as will be explained in greater detail hereinafter.

The annular element 22 is mounted on a ball-bearing 45 which is employed as a frictionless thrust bearing at the end opposite to the balls 34 and is adapted to cooperate with a ball-thrust bearing 46 which is coaxial with the rotary plug 19 and located in the vicinity of the ball-bearing 45.

In accordance with an important feature of the invention, the distributor is provided with a device for testing and ensuring correct operation of the means for locking the annular element 22 in position with respect to the rotary plug 19, said means being designated by the reference numerals 34, 37, 38, 42, 43, 41, 39.

Figure 5:
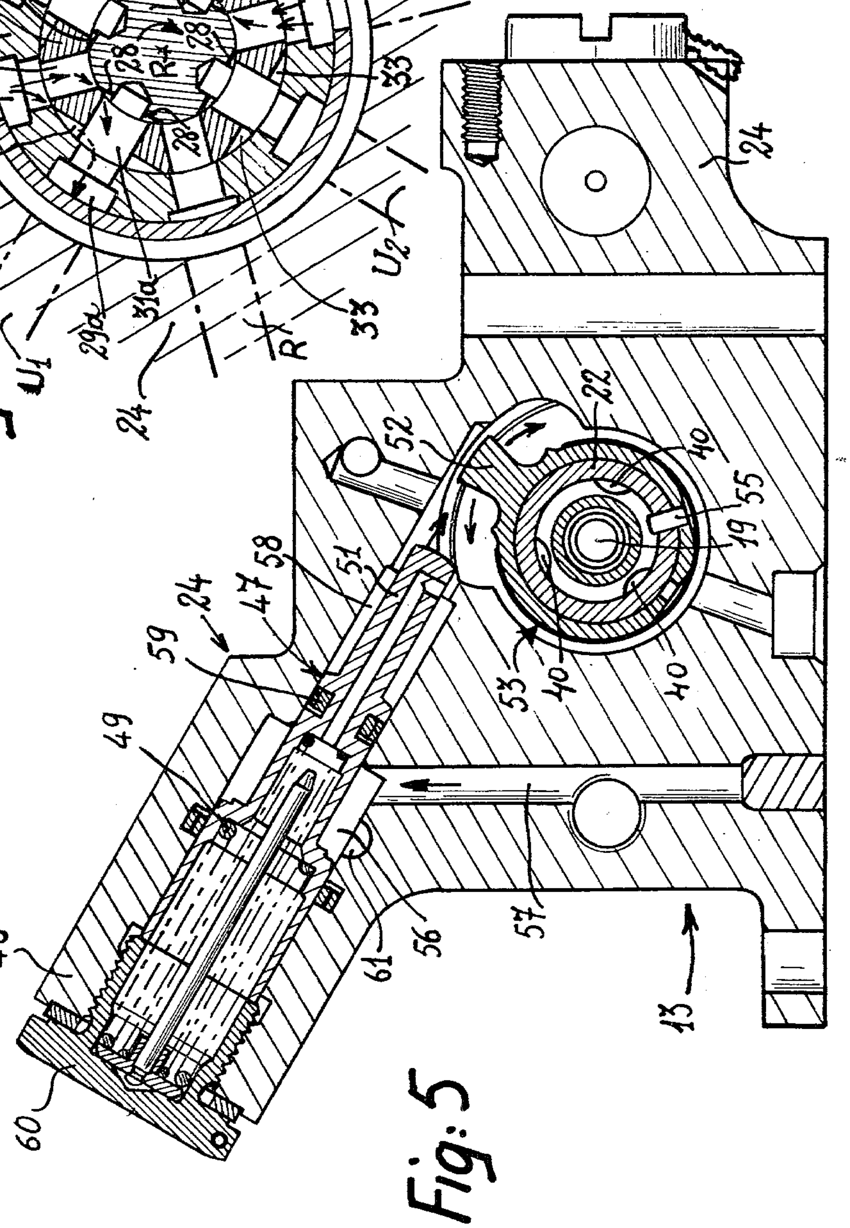
FIG. 5 is a transverse sectional view taken along line V—V of FIG. 6.

The testing device as shown in particular in FIGS. 2 and 5 first comprises a jack 47 which is housed within a lateral projection 48 of the casing 24 and which can be actuated by an elastic member consisting of a helical spring 49 in the example shown. Said spring is applied against a cap 60 which is screwed within the projection 48 and also serves as an abutment for the jack 47 proper. The spring 49 applies a constant force on an internal shouldered portion of the jack 47 so as to thrust the operating rod 51 of said jack against a radial arm 52 which forms part of a collar 53, said collar being mounted at the end of the annular element 22 in which the locking balls 34 are located and being coupled for rotation with the element 22 by means of a stud 55 (as shown in FIG. 5). Furthermore, the jack 47 is positioned within a cylindrical chamber 56 which communicates with the hydraulic supply circuit through a pipe 57. The pipe 61 communicates with the duct P of the annular member 25. The operating rod 51 of the jack is housed within a bore 58 which is separated from the chamber 56 in leak-tight manner by means of an annular seal 59 inserted in the periphery of the jack 47.

If the chamber 56 is not under pressure as a result of non-supply of oil from the hydraulic circuit, the spring 49 exerts a thrust on the jack 47 without any opposing force, with the result that the rod 51 comes into contact with the arm 52 which is displaced in pivotal motion and drives the collar 53 in the clockwise direction as indicated by the arrows in FIG. 5. Said collar in turn drives the annular element 22 in rotation by means of the stud 55, with the result that the balls 34 are thrust outwards from their recesses 35, run along the inclined ramps of these latter, slide into the openings provided for the passage of the guide 36 and displace the rocker-arm 38 in pivotal motion about its pin 43. In consequence, the pusher 41, 42 operates the switch unit 44 and this latter then turns-on the alarm lamp which consequently warns the operator that the element 22 has disengaged from its normal position. Furthermore, the pipe 61 is isolated from the pipe 57 by means of the jack 47.

If the hydraulic fluid is introduced into the chamber 56 via the pipe 57 until its pressure becomes preponderant with respect to the oppositely acting force of the spring 49, the jack 47 comes into its position of abutment and the pipe 61 communicates with the pipe 57 since the rod 51 no longer produces a movement of rotation of the collar 53. This position is shown in FIG. 5. It is therefore apparent that this testing-jack device 47 makes it possible to check whether the device for locking the element 22 in its normal position permits rotational displacement of said element 22 when a sufficient torque is exerted on this latter in the absence of pressurization of the hydraulic chamber 56.

The operation of the hydraulic distributor which has just been described is as follows:

When the rotary plug 19 is caused to rotate about its shaft by actuating the lever 18, each bore 29, 31 is put into communication with either of the two adjacent bores, depending on whether the rotary plug 19 is caused to rotate in one direction or in the other. Thus it has been explained earlier with reference to FIG. 7 that, if the plug 19 is caused to rotate in the clockwise direction R, the hydraulic fluid under pressure which is admitted through the pipe P is passed into the bores 29, 31 which communicate with the utilization passage U1 whilst the fluid which is admitted through the pipe U2 is transferred to the return pipe R.

Now if the rotary plug 19 is no longer capable of rotating with respect to the annular element 22 for an accidental reason such as, for example, the introduction of a foreign body between the plug 19 and the element 22, this latter is driven in rotation by the plug 19 as soon as the torque exerted by the rotary plug exceeds the locking torque exerted on the annular element 22 by the balls 34 under the thrust of the disk 37 and of the spring 39, by means of the rocker-arm 38. Under these conditions, the annular element 22 rotates coaxially with the rotary plug 19 and in rigidly fixed relation to this latter, and the balls 34 are progressively thrust outwards from their recesses 35 while producing a pivotal displacement of the rocker-arm 38 in the direction opposite to the thrust exerted by the restoring spring 39 as explained earlier.

Correlatively, the warning lamp is turned-on and draws the pilot's attention to the fault condition which arises from the fact that the rotary plug is locked within the annular element 22. Moreover and above all, the rotation of the annular element 22 establishes communications between the bores 29 and 29*a* as a function of the direction of rotation of the element 22 and of the position in which the rotary plug 19 is locked within the annular element 22. Should the rotary plug 19 rotate in the clockwise direction R as in the case previously described, it is apparent that the passages 33 machined at the periphery of the element 22 between the openings 31 of this latter establish the communication from the position shown in FIG. 7 between the bores 29 containing fluid under pressure P and the bores 29*a* connected to the utilization passage U1. In consequence, the oil under pressure passes directly from a bore 29 under the pressure P to the adjacent bore 29*a* which is connected to the utilization passage, this communication being represented schematically by the arrows in FIG. 7. Thus, depending on the position in which the rotary plug 19 is locked within the annular element 22, the communications established through the passages 33 produce action:

in place of the recesses 28 machined on the rotary plug 19 if this latter is locked in the central position;

complementarily to the rotary plug 19 if locking of this latter takes place in the same direction as the control;

by opposition to the rotary plug 19 if this latter is locked in the direction opposite to the control direction. This latter configuration results in intercommunication of the passages P, U1, U2 and R and makes the chambers of the corresponding jack inoperative. The other jack of the servo-control unit is then maintained at full power and is sufficient to carry out the desired operation.

Thus, in the event of accidental locking of the rotary plug 19 with respect to its cylindrical bushing 22, this latter is driven in rotation as soon as the torque exceeds a predetermined value related to the locking thrust exerted by the balls 34 on the element 22, with the result that the servo-control unit of the apparatus continues to be supplied normally with hydraulic fluid under pressure.

However, this fault condition is brought to the operator's attention by turning-on of the warning lamp as mentioned in the foregoing.

It is apparent that the distributor in accordance with the invention is considerably more advantageous than known designs since it dispenses with the need to mount two identical distributors which are interconnected so as to ensure a normal hydraulic supply in the event of failure of one of the distributors.

The hydraulic distributor in accordance with the invention is therefore much lighter in weight and of much smaller bulk than known devices as well as being less costly. Its reliability is excellent since there is no reason to expect the slightest danger of locking of the annular element 22 with respect to the stationary sleeve 23.

The device for testing the locking system (41, 42, 38, 37, 38) of the annular element 22 by means of the jack 47 and its thrust spring 49 advantageously enables the pilot to check the correct performance of this safety system when the hydraulic chamber 56 is depressurized.

The pilot then puts said chamber under pressure and the annular element 22 returns automatically to its normal position under the elastic force exerted by the restoring device (39, 41), the balls 34 being returned to the bottom of their recesses 35 in their normal positions.

The invention is not limited to the embodiment hereinabove described and permits a large number of alternative forms of execution. It is thus possible to replace the device for pressure-testing of the locking system of the element 22 by any other equivalent means. Depending on the available volume, it is also possible to place the assembly consisting of spring 39, pusher 41, 42 and switch unit 44 in the line of extension of the distributor shaft, thus dispensing with the rocker-arm 38, the pivot-pin 43 and related elements.

What is claimed is:

1. A hydraulic distributor primarily intended to equip servo-control systems of aircraft and helicopters, comprising a plug rotatably mounted within a stationary sleeve housed within a casing and pierced by bores for admission of a hydraulic fluid under pressure and discharge of the fluid to the collector-tank, progressively-opening passages on the periphery of the rotary plug in order to ensure circulation of the hydraulic fluid from one bore of the sleeve to the next when the plug is caused to rotate, said hydraulic distributor comprising an annular element interposed between the sleeve and the rotary plug, said annular element being pierced by radial openings in the line of extension of the bores of the stationary sleeve, progressively-opening passages in the outer periphery of said annular element so as to permit progressive transfer of the hydraulic fluid from one bore of the stationary sleeve to the adjacent bore if said annular element is caused to rotate, and locking means for maintaining the annular element in a normally stationary position at the time of rotation of the plug and for permitting rotational displacement of the annular element by the plug in the event of seizure of this latter within said annular element in order that the circulation of the hydraulic fluid may then be permitted to circulate from one bore to another through the peripheral passages of said annular element.

2. A distributor according to claim 1, wherein the rotary plug is mounted on needle bearings within the annular element.

3. A distributor according to claim 1 or claim 2, wherein the means for maintaining the annular element in a stationary position during normal operation of the distributor and for releasing said element in rotation in the event of seizure of the rotary plug with respect to said element comprise balls which are preferably three in number and spaced at equal angular intervals, said balls being partially engaged in corresponding recesses having V-shaped ramps machined on one end of the annular element, said balls being capable of sliding within openings of a disk which is attached to the distributor casing, and wherein said means comprise a second disk urged elastically against the balls by a rocker-arm which is in turn thrust by an elastic member housed within the distributor casing, with the result that if the torque to be exerted in order to cause the plug to rotate within the annular element becomes higher than a predetermined value, the annular element is driven in rotation, thrusts the balls outwards from their recesses in opposition to the controlling force exerted by the disk and the rocker-arm and permits the intended distribution of hydraulic fluid.

4. A distributor according to claim 3, wherein the elastic member produces action on the rocker-arm by means of a pusher adapted to cooperate with an electric switch unit which turns-on a warning lamp when the balls thrust-back the rocker-arm in opposition to the action of the spring correlatively with a movement of rotation of the annular element.

5. A distributor according to claim 1, wherein said distributor is equipped with a device for testing the correct performance of the locking means and releasing the annular element in rotation.

6. A distributor according to claim 5, wherein the device aforementioned comprises a jack housed within the distributor casing, said jack being actuated by an elastic member and urged against a radial arm of a collar mounted at one end of the annular element and rotationally coupled therewith so as to tend to cause rotation of said annular element and to turn-on an alarm, and wherein said jack is positioned within a chamber which communicates with the hydraulic circuit so that, when said chamber is pressurized by the hydraulic fluid, said fluid applies a pressure on the jack which is oppositely-acting and higher than the force applied by its elastic thrust member and consequently returns the annular element to the initial position in which said element is locked rotationally.

7. A distributor according to claim 1, wherein said peripheral passages of said rotary plug are substantially duplicated by said peripheral passages of said annular element.

* * * * *